W. A. JOHNSON.
VEHICLE SPRING.
APPLICATION FILED DEC. 21, 1912.

1,095,641.

Patented May 5, 1914.

Witnesses:
Milton Lenoir
W. Linn Allen

Inventor:
William A. Johnson
By Perée Bain Mays
Attorneys

UNITED STATES PATENT OFFICE.

WILLIAM A. JOHNSON, OF CHICAGO, ILLINOIS, ASSIGNOR TO JOHNSON SPECIALTY COMPANY, A CORPORATION OF ILLINOIS.

VEHICLE-SPRING.

1,095,641.  Specification of Letters Patent.  Patented May 5, 1914.

Application filed December 21, 1912. Serial No. 737,978.

*To all whom it may concern:*

Be it known that I, WILLIAM A. JOHNSON, a citizen of the United States, residing at Chicago, in the county of Cook and State of Illinois, have invented certain new and useful Improvements in Vehicle-Springs, of which the following is a specification.

My invention relates to improvements in suspension devices and more particularly to resilient suspension devices adapted for insertion between a running gear part and a body part of a vehicle to supplement the action of the ordinary vehicle springs in absorbing shocks and jars.

One of the objects of my invention is to provide such a device wherein springs of different characters are correlated for effective resilient support of the vehicle body, and more particularly my invention contemplates the use of relatively heavy expansion spring and a relatively light compression spring.

Another object of my invention is to provide a structure involving with such springs suitable hanger members, a spring-surrounding casing which may contain oil in which the springs are submerged, and other parts associated with the springs, the organization of the parts being such that the suspension device is durable, compact, and efficient, the movable parts being properly guided and the strains incident to use properly distributed.

Another object is to provide such a device with an easy means of adjusting the normal spring tension.

Other and further objects of my invention will become apparent to those skilled in the art from a consideration of the following description when taken in conjunction with the accompanying drawing, wherein—

Figure 1:
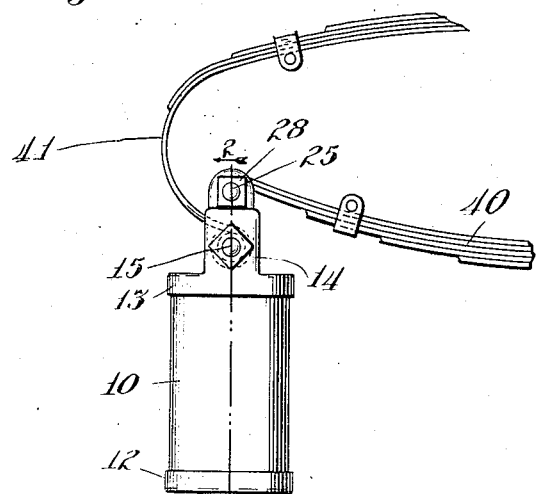
Figure 2:
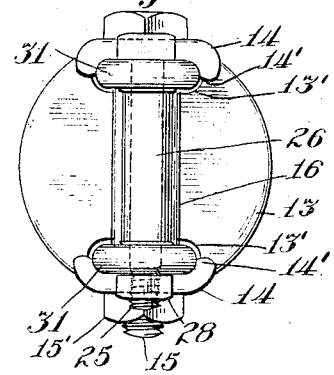
Figure 3:
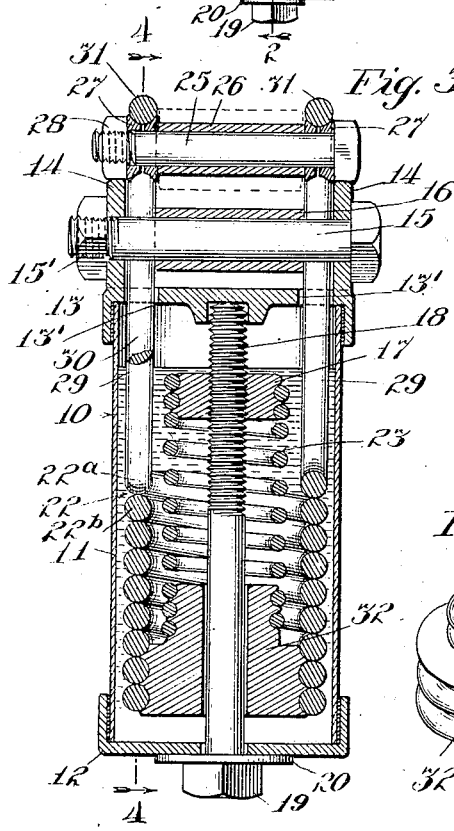
Figure 5:
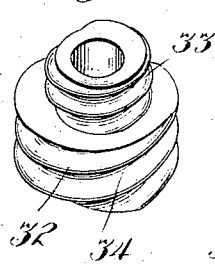
Figure 4:
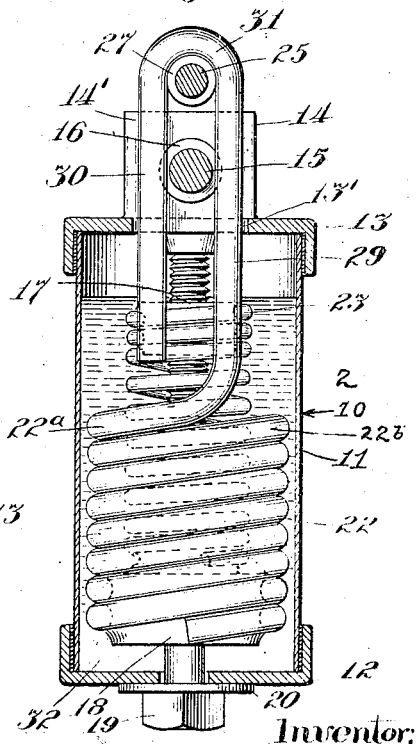

Figure 1 is a side elevation showing an application of the suspension device between a running gear part and a body part of a vehicle; Fig. 2 is a plan view of the suspension device constructed in accordance with my invention; Fig. 3 is a longitudinal central section thereof; Fig 4 is a side elevation, taken at right angles to the plane of Fig. 3, with the casing in section; and Fig. 5 is a detail of the particular means for connecting one of the springs with the other.

In the drawings, 10 indicates in general a casing which in the particular construction shown is composed of a cylindrical casing member 11, a lower head 12, and an upper head 13, the heads tightly engaging the cylindrical member 11 so that the casing may be filled with oil for surrounding the movable casing-contained parts to be described, the casing parts being slip-fitted together,— that is, connected without screw threading or extraneous fastening, so that they may easily be slipped together or separated.

As will be hereafter specifically pointed out, the device embodies springs of different character, said springs being connected together in suitable fashion for action in series; that is to say, so that the one spring effectively bears on the end portion of the other so that the springs are effectively in tandem arrangement, and each having suitable connection with the respective one of two hanger members. Further, the particular construction shown preferably includes means for varying the connection between one spring and an associated part. Therefore, for convenience in carrying out my invention with these particular features embodied in the device, one of the hanger members may be made integral with the upper casing head 13, and one of the springs may have connection to said casing head through the agency of an adjustable part carried thereby. Specifically, 14—14 indicate ears projecting upward from diametrically opposite edges of the upper casing head 13, each ear being perforated to receive a transverse bolt-rod 15, secured in place by nut 15' and provided with a spacing sleeve 16. The adjustable spring-engaging part may take the form of an exteriorly-grooved and interiorly-threaded member 17, screwed on bolt 18, which is passed through a central perforation in the bottom head 12 of the casing with its head 19 in position to be readily turned to vary the relative height of the spring-engaging member 17. A washer 20 may be provided between the head 19 of the bolt and the casing head 12 to close the perforation therein against escape of oil; and for positive maintenance of the bolt in true axial position, the upper head 13 may be provided with a recessed portion to receive the other end of the bolt, the abutment of the end of the bolt against the upper casing head aiding the engagement between the bolt head 19 and the lower casing head 12 to effect the necessary engagement between the parts in the operation thereof as will hereafter more clearly appear.

The springs are shown respectively at 22 and 23, the former for connection to another hanger member and the latter for connection between the spring-engaging member 17 and the spring 22. I have found the operation of a device embodying my invention to be most efficient when, for spring 22, I use a relatively heavy expansion spring and for spring 23 a lighter compression spring. Further, my invention contemplates the use of a heavy expansion spring the successive coils of which are normally under stress with the successive coils pressed into contact, and to this end I use two springs, 22$^a$ and 22$^b$, which would individually stand with their successive coils nearer to each other than the thickness of a single coil, and screw one into the other so that the coils of one are interengaged with the coils of the other, both springs so interengaging standing under a tension which must first be overcome before the coils will start to separate. The hanger member to which said expansion spring is connected may be of any suitable form, an advantageous arrangement being herein shown which involves only the provision of a transverse bolt-rod 25 carrying a spacing sleeve 26, a washer 27 at each end of the spacing sleeve, and a retaining nut 28. Each of the washers 27 are grooved to receive the end of the respective spring 22$^a$ or 22$^b$ which, as best shown in Fig. 4, is bent to provide two vertical portions 29 and 30 which extend up through the perforations 13' in head 15 and which receive therebetween the bolt-rods 15 and 25. The bent portion 31, between said vertical portions 29 and 30, of course, passes over the washer 27 seated in the groove thereof. In this arrangement, it will be noted that a particularly adaptable expansion spring is provided by the two interengaged springs 22$^a$ and 22$^b$ and that this spring structure also provides two free ends at the top thereof, one for each side of the bolt-rod 25, the expansion spring 22 as a whole having ends for connection to the bolt-rod at diametrically opposite points of the spring. As a further structural advantage, the lugs 14 of the other hanger member are preferably extended inwardly around the portions 29 and 30 as indicated at 14' in Fig. 2, so that the portions 29 and 30 work in a groove formed by said inturned portions 14', thus affording guidance and lateral support of one hanger member by the other.

Any suitable arrangement may be provided for the engagement or connection between the lower free ends of the expansion spring 22 and the compression spring 23 to impose the lower end of spring 23 on the lower part of spring 22, my preference being to provide means in guided association with the bolt 18 bearing on spring 22 and receiving spring 23, so that there shall be in the use of the device no lateral movement of the springs at their lower free ends. This means, in the structure shown, takes the form of a centrally perforated member 32, shown in detail in Fig. 5 and having two exteriorly-grooved portions 33 and 34 of different diameter, the smaller portion having grooves, like the grooves in the adjustable member 17, for engagement of the coils of compression spring 23, and the larger portion 34 having grooves for engagement of the coils of spring 22 as shown in Fig. 3. Thus, the member 32 may be slipped on the bolts 18 for free longitudinal movement thereon, springs 22 and 23 screwed over the respective grooved portions 34 and 33, the adjustable member 17 screwed onto the bolt, and the free end of spring 23 screwed over its grooved exterior, when strains put upon either spring will be partly borne by the other spring through the connection at their lower ends, but without possibility of lateral displacement at said free connected ends. Further, turning of the bolt head 19 raises or lowers the member 17 to lessen or increase the normal stress of the springs.

In the use and operation of the device, the upper bolt-rod 25,—that from which the expansion spring is hung,—is secured to a running gear part, as by curling the end of a leaf spring 40 of a vehicle around the sleeve 26, and the lower bolt-rod 16 is connected to the body part of the vehicle, as to the forward downturned end of the frame, indicated at 41. As normally standing, therefore, the weight of the body presses downwardly upon the casing head 13 and thence,—both directly against the end of the bolt and through the cylindrical casing member 11 to the lower casing head 12 and head 19 of the bolt,—the downward pressure is transmitted to the spring-engaging member 17. Spring 23, of course, presses upwardly to sustain the weight, its downward pressure against member 32 being opposed by the upward tension of spring 22, which is connected to the supporting or running gear element of the vehicle through the bolt 25. When shocks are imparted to said bolt 25, the upper end of spring 22 will be pulled sharply upward, such upward movement acting through the spring to pull member 32 upward and thereby compress spring 23 and through it transmit the upward pressure to the bolt-rod 15 through the heretofore described parts, all of the movements resulting from such shock being deadened by the oil in which the moving parts are submerged. The use of such springs arranged between the hanger members in the correlation described operates effectively to take up sudden shocks such as are commonly imparted to the running gear of a vehicle, with the result that the body of the vehicle runs smoothly and without undue vibration.

While I have herein described a single embodiment of my invention, it will be apparent to those skilled in the art that many changes may be made in the parts described without departing from the spirit and scope of the appended claims.

What I claim is:

1. In a suspension device, the combination, with hanger members, of an expansion spring connected to one of said hanger members, a compression spring connected to the other hanger member, means of connection between said expansion and compression springs, and means extending through the springs for operation from beyond their connected ends to vary the connection between one of said springs and its associated part for adjustment of the spring tension of the device.

2. In a suspension device, the combination, with hanger members, and a cylindrical casing, of an expansion spring and a compression spring within said casing, said springs being concentrically arranged and connected together at one end, means for connection of the springs at their other ends to the respective hanger members, and means extending through the springs and the casing for operability from the exterior of the casing to adjust the connection of one spring with its hanger member.

3. In a suspension device, the combination, with hanger members, of a casing, a central guiding member in said casing, an expansion spring and a compression spring within said casing concentrically arranged and connected together at one end in guided association with said central guiding member, the other end of each said spring having connection to one of the hanger members.

4. In a suspension device, the combination, with hanger members, of a casing, a central guiding member in said casing, an expansion spring and a compression spring within said casing concentrically arranged and connected together at one end in guided association with said central guiding member, the free end of one said spring having connection to one of the hanger members and the free end of the other spring having connection to said guiding member, and means between said guiding member and the other member to complete the connection from the springs to said other hanger member.

5. In a suspension device, the combination, with hanger members, of a casing, a central guiding member in said casing, an adjustable spring-engaging member on said guiding member, a spring engaged by said adjustable member with its free end guided by said central guiding member, and means completing the connection between said guided free end and the other hanger member.

6. In a suspension device, the combination, with hanger members, of a casing, a central guiding member in said casing, an adjustable spring engaging member on said guiding member, a spring engaged by said adjustable member with its free end guided by said central guiding member, and a spring connected between said guided free end of the first spring and the other hanger member.

7. In a suspension device, the combination, with hanger members, for connection respectively to a supporting element and a supported element, an expansion spring connected at one end to one of the hanger members, a compression spring connected at one end to the free end of said expansion spring whereby said springs act against each other at said point of connection, a casing, a bolt extending from the bottom of the casing axially within said springs, and a member upon said bolt engaged by said free end of the compression spring.

8. In a suspension device, the combination, with hanger members, a cylindrical casing member having heads for closing the ends thereof, one said head associated with one hanger member, a bolt extending into the casing member from the center of the bottom head of the casing, and concentric compression and expansion springs engaged in series between said bolt and the other hanger member.

9. In a suspension device, the combination, with hanger members, of two expansion springs beyond both hanger members arranged with the coils of one interengaged with the coils of the other, means to connect one end of each spring to a hanger member at a point opposite the point of connection of the other spring thereto, and means returning past the springs to connect the other ends of said springs with the other hanger member.

10. In a suspension device, the combination, with hanger members, of two expansion springs arranged with the coils of one interengaged with the coils of the other, means to connect one end of each spring to a hanger member at a point diametrically opposite to the point of connection of the other spring thereto, a compression spring within said expansion springs, and means to connect the ends of said compression spring respectively to the free ends of said interengaged expansion springs and to the other hanger member.

11. In a suspension device, the combination, with hanger members, of a compression spring and an expansion spring concentrically arranged and connected to each other and to the respective hanger member, and an oil-containing casing inclosing said springs comprising a cylinder and heads maintained under longitudinally compressive stress by said springs.

12. In a device of the character described, a casing-wall, an upper head slip-fitted thereon, a lower head slip-fitted thereon, a part projecting from the lower head into the casing, a spring structure bearing on the said projecting part to force the lower head forward to the upper head and thereby hold the casing structure together, and means to connect the spring structure and the upper head respectively to points of support on the vehicle running gear and frame.

13. In a device of the character described, hanger members, a casing having a head provided with grooved ears for connection with one hanger member, and having apertures contiguous to said ears, a spring structure in the casing having two folded spring-loops extending through said openings and guided in the grooves in said ears, said folded loops being arranged for connection with the other hanger member.

14. In a device of the character described, two transverse bolts one above the other, a pair of springs suspended from one said bolt, a head suspended from the other bolt, each said spring having a folded extension extending through and guided in a suitable opening in the head, and connections affording bearing between the extremities of said springs and said head.

15. In a suspension device, the combination, with hanger members, for connection respectively to a supporting and a supported element, disposed in approximately vertical alinement, a casing below said hangers having its upper end connected to the lower hanger, a pair of springs, each having a folded upper end extending from engagement with the upper hanger member into the interior of the casing on diametrically opposite sides thereof, and a connection between the lower ends of said spring at the bottom of the casing.

16. In a device of the character described, the combination of two parallel, transverse, suspension bolts, a pair of springs supported by one of said bolts, each said spring having a folded portion to engage the bolts and a downward continuation terminating in a coil, a casing surrounding said spring coils, said casing having a head carried by the other suspension bolt and provided with openings for the downwardly extending portions of said springs, and means effecting operative connection between the two spring coils and the opposite end of the casing.

17. In a device of the character described, the combination of a casing, having heads and a cylindrical connection between said heads, a bolt extending through the lower head, a bearing member adjustably mounted on said bolt, a suspension bolt connected with the head of the casing, a second suspension bolt, and a pair of springs connected with said second suspension bolt extending through the head of the casing into the interior thereof, and connections between the said adjustable bearing member and the ends of said springs.

18. In a device of the character described, a casing comprising an upper head, a lower head and a connecting cylinder, a bolt extending through the lower head of said cylinder, an adjustable bearing part thereon, a transverse suspension bolt connected with the upper head, another transverse suspension bolt parallel with and above the first said bolt, and spring connections interposed between said bearing member within the casing and the last said bolt, said connections comprising two coil springs, each terminating at its upper end in an upwardly extending folded portion projecting to suitable openings in the upper head, straddling the lowest suspension bolt and embracing the upper suspension bolt.

19. In a device of the character described, the combination of a casing, comprising an upper head, a lower head and an interposed casing part, a bolt extending through said lower head and having guiding bearing in the upper head, an adjustable bearing part carried by said bolt, spring means connected with said bearing part and extending to the exterior of the casing, and means to connect the upper head of the casing and said spring means to opposed vehicle parts.

In testimony whereof I hereunto set my hand in the presence of two witnesses.

WILLIAM A. JOHNSON.

In the presence of—
  W. LINN ALLEN,
  MARY F. ALLEN.